US012172311B2

(12) United States Patent
Hasunuma et al.

(10) Patent No.: US 12,172,311 B2
(45) Date of Patent: Dec. 24, 2024

(54) ROBOT CONTROL DEVICE, ROBOT SYSTEM, AND ROBOT CONTROL METHOD

(71) Applicant: KAWASAKI JUKOGYO KABUSHIKI KAISHA, Kobe (JP)

(72) Inventors: Hitoshi Hasunuma, Kobe (JP); Takeshi Yamamoto, Kobe (JP); Kazuki Kurashima, Kakogawa (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 559 days.

(21) Appl. No.: 17/312,718

(22) PCT Filed: Dec. 27, 2019

(86) PCT No.: PCT/JP2019/051483
§ 371 (c)(1),
(2) Date: Jun. 10, 2021

(87) PCT Pub. No.: WO2020/138436
PCT Pub. Date: Jul. 2, 2020

(65) Prior Publication Data
US 2022/0016761 A1  Jan. 20, 2022

(30) Foreign Application Priority Data
Dec. 27, 2018  (JP) .................................. 2018-245459

(51) Int. Cl.
*B25J 13/00*   (2006.01)
*B25J 9/16*    (2006.01)
(Continued)

(52) U.S. Cl.
CPC ............. *B25J 9/163* (2013.01); *B25J 9/1653* (2013.01); *B25J 9/1661* (2013.01); *B25J 9/1664* (2013.01)

(58) Field of Classification Search
CPC ........ B25J 9/163; B25J 9/1653; B25J 9/1661; B25J 9/1664; B25J 9/00; B25J 9/16;
(Continued)

(56) References Cited

U.S. PATENT DOCUMENTS 8,452,451 B1 * 5/2013 Francis, Jr. ............ B25J 9/1658
700/258
9,637,310 B1 * 5/2017 Zou ........................ B65G 43/08
(Continued)

FOREIGN PATENT DOCUMENTS

JP   2017-030135 A   2/2017

OTHER PUBLICATIONS

Kappler et al., "Data-Driven Online Decision Making for Autonomous Manipulation," Autonomous Motion Department, Max Planck Institute for Intelligent Systems, Tubingen, Germany and Computational Learning and Motor Control Lab, University of Southern California, Los Angeles, USA.

*Primary Examiner* — Adam R Mott
*Assistant Examiner* — Byron Xavier Kasper
(74) *Attorney, Agent, or Firm* — Oliff PLC

(57) ABSTRACT

A robot control device includes: a learned model created through learning work data composed of input and output data, the input data including states of a robot and the surroundings where humans operate the robot to perform a series of works, the output data including human operation corresponding to the case or movement of the robot caused thereby; a control data acquisition section that acquires control data by obtaining output data related to human operation or movement from the model, being presumed in response to and in accordance with the input data; a completion rate acquisition section acquiring a completion rate indicating to which progress level in the series of works the output data corresponds; and a certainty factor acquisition
(Continued)

section that acquires a certainty factor indicating a probability of the presumption in a case where the model outputs the output data in response to the input data.

17 Claims, 11 Drawing Sheets

(51) Int. Cl.
*B25J 13/02* (2006.01)
*B25J 13/04* (2006.01)

(58) Field of Classification Search
CPC ...... B25J 9/0081; B25J 9/0096; B25J 9/1605; B25J 9/161; B25J 9/1628; B25J 9/1656; B25J 9/1658; B25J 9/1669; B25J 9/1679; B25J 9/1687; B25J 9/1692; B25J 11/005; B25J 13/006; G05B 2219/33006; G05B 2219/39271; G05B 2219/39298; G05B 2219/40032; G05B 2219/40102; G05B 2219/40116; G05B 2219/40153

See application file for complete search history.

(56) References Cited

U.S. PATENT DOCUMENTS

| | | | |
|---|---|---|---|
| 10,573,295 B2* | 2/2020 | Zhou | G06N 3/044 |
| 10,618,164 B2* | 4/2020 | Wang | B25J 9/163 |
| 10,926,408 B1* | 2/2021 | Vogelsong | B25J 9/163 |
| 2011/0184555 A1* | 7/2011 | Kosuge | B25J 11/00 |
| | | | 700/245 |
| 2015/0323398 A1* | 11/2015 | Lauzier | B25J 9/163 |
| | | | 901/30 |
| 2017/0220008 A1* | 8/2017 | Takahashi | G05B 23/024 |
| 2018/0117769 A1* | 5/2018 | Delazari Binotto | G05D 1/0246 |
| 2019/0121335 A1* | 4/2019 | Yoneda | G05B 19/0405 |

* cited by examiner

ROBOT CONTROL DEVICE, ROBOT SYSTEM, AND ROBOT CONTROL METHOD

TECHNICAL FIELD

The present invention primarily relates to a robot control device that controls a robot.

BACKGROUND ART

Conventionally known is a robot control device including a machine learning device capable of creating a model related to a work movement of a robot. Patent Literature 1 (PTL 1) discloses a robot control device of this type.

PTL 1 discloses a robot system including a machine learning device capable of learning an optimal movement of a robot in taking out a disorderly-placed workpiece without intervention of human.

CITATION LIST

Patent Literature

PTL 1: Japanese Patent Application Laid-Open No. 2017-30135

SUMMARY OF INVENTION

Technical Problem

Conventionally, an AI system uses a large amount of input and output data to presume a causal relationship between input and output, and creates a model. When a learned model estimates output data based on input data, a basis for the estimation is not explained to a user, but is treated as a so-called blackbox. When using the AI system for controlling a robot, therefore, the user is hardly given anything that can convince the user of an autonomous movement of the robot based on a presumed output of the AI system.

The present invention is made in view of the circumstances described above, and aims to provide a robot control device, and the like, that can make a robot movement based on an estimation by a learned model more convincing to a user.

Solution to Problem

The problem to be solved by the present invention is as above. The following describes solutions to the problem as well as advantageous effects thereof.

A first aspect of the present invention provides a robot control device having the following configuration. The robot control device includes a learned model, a control data acquisition section, a completion rate acquisition section, and a certainty factor acquisition section. The learned model is created through learning work data composed of input data and output data, the input data including states of a robot and surroundings of the robot in a case where human operates the robot to cause the robot to perform a series of works, the output data including a human operation corresponding to the case or a movement of the robot caused by the human operation. The control data acquisition section acquires control data on the robot used to make the robot perform the works, the acquisition being made by obtaining output data related to a human operation or a movement of the robot from the learned model, the human operation or the movement of the robot being presumed in response to and in accordance with input data received by the learned model, the input data being related to states of the robot and surroundings of the robot. The completion rate acquisition section acquires a completion rate indicating to which progress level in the series of works the output data outputted by the learned model corresponds. The certainty factor acquisition section acquires a certainly factor indicating a probability of the presumption in a case where the learned model outputs the output data in response to reception of the input data.

A second aspect of the present invention provides a robot control method having the following configuration. The robot control method uses a learned model that denotes a model created through learning work data composed of input data and output data, the input data including situations of a robot and surroundings of the robot in a case where human operates the robot to cause the robot to perform a series of works, the output data including a human operation corresponding to the case or a movement of the robot caused by the human operation, the robot control method including: a control data acquisition step of acquiring control data on the robot used to make the robot perform the works, by obtaining output data related to a human operation or a movement of the robot from the learned model, the human operation or the movement of the robot being presumed in response to and in accordance with input data received by the learned model, the input data being related to situations of the robot and surroundings of the robot; a completion rate acquisition step of acquiring a completion rate indicating to which progress level in the series of works the output data outputted by the learned model corresponds; and a certainty factor acquisition step of acquiring a certainty factor indicating a probability of the presumption in a case where the learned model outputs the output data in response to reception of the input data.

Accordingly, based on the completion rate and the certainty factor thus acquired, the reason why the learned model has made such an output in response to the input can be inferred to some extent by the user. As a result, the blackboxness which is conventionally inherent in the learned model can be reduced, so that the user can apply the learned model to a robot control with a sense of conviction. In addition, the user can examine the learning more appropriately, by using the acquired completion rate and certainty factor as a clue.

Advantageous Effects of Invention

The present invention can provide a robot control device, and the like, that can make a robot movement based on an estimation by a learned model more convincing to a user.

DESCRIPTION OF EMBODIMENTS

Figure 1:
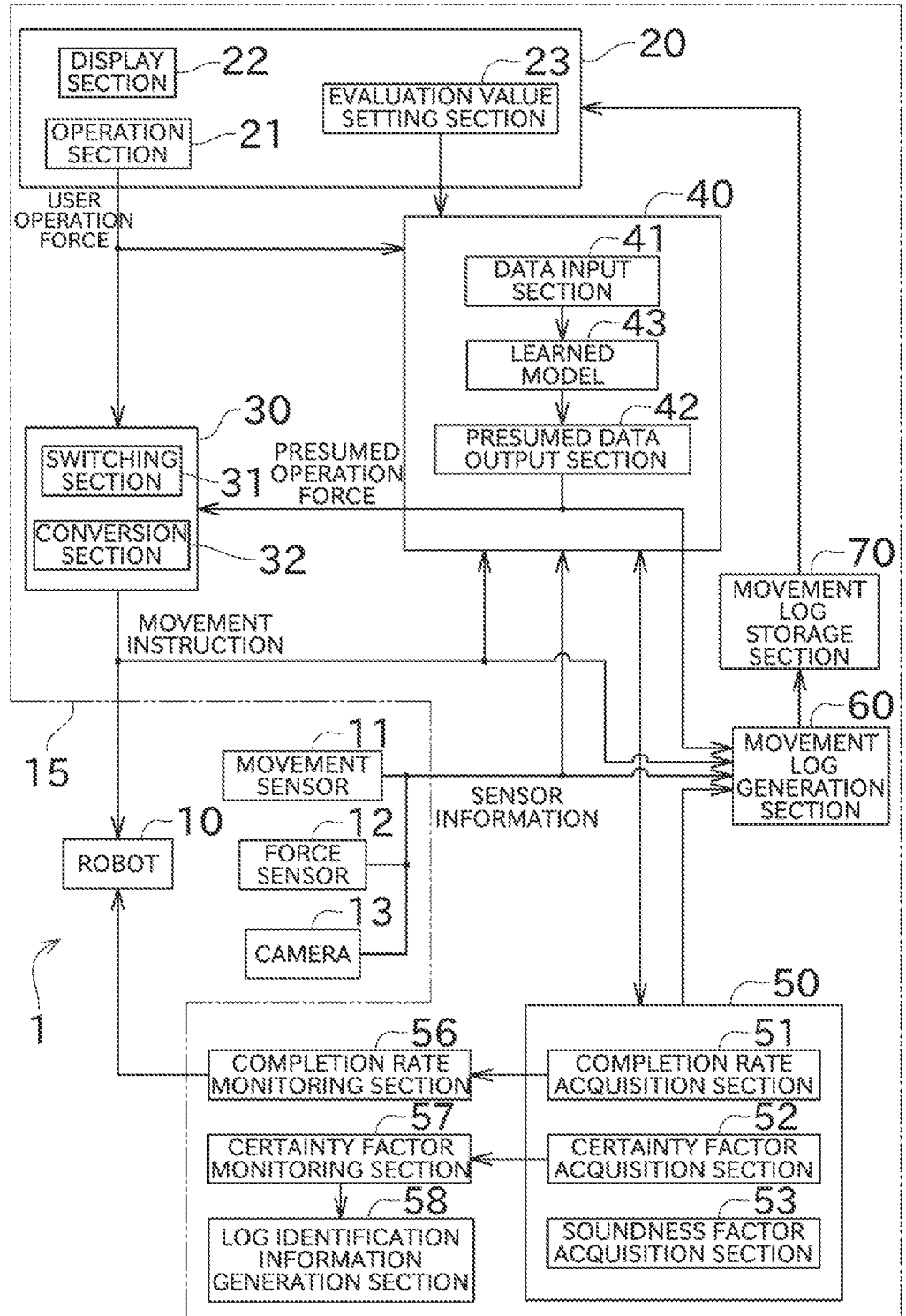
FIG. 1 A block diagram showing an electrical configuration of a robot system according to an embodiment of the present invention FIG. 2 A diagram showing exemplary robot movements that are to be learned by an AI system according to the embodiment FIG. 3 A diagram for explanation of acquisition of a completion rate FIG. 4 A diagram showing an exemplary change in the value of the completion rate in accordance with robot movements FIG. 5 A diagram illustrating acquisition of a certainty factor FIG. 6 A diagram showing an exemplary change in the value of the certainty factor in accordance with robot movements FIG. 7 A diagram showing soundness factors, and an example of a movement log having evaluation values assigned FIG. 8 A diagram illustrating soundness factors after relearning FIG. 9 A diagram illustrating a process of starting an autonomous movement of the robot in the middle of a series of movements FIG. 10 A diagram illustrating a process of terminating an autonomous movement of the robot in the middle of a series of movements FIG. 11 A diagram illustrating a process of transferring an autonomous movement based on two different learned models

Hereinafter, an embodiment of the present invention will be described with reference to the drawings. FIG. 1 is a block diagram showing an electrical configuration of a robot system 1 according to an embodiment of the present invention.

The robot system 1 is a system that performs works by using a robot 10. The works performed by the robot 10 are various works, examples of which include assembling, processing, coating, washing, and the like.

The robot 10 is controlled with a model (learned model 43) that is created through machine learning of data, as will be detailed later. The robot system 1, therefore, basically requires no assistance from a user, and is able to perform works autonomously. The robot 10 is able not only to perform works autonomously but also to perform works in accordance with the user's operations. In the following, a state of the robot 10 performing works autonomously may be referred to as "autonomous running", and a state of the robot 10 performing works in accordance with the user's operations may be referred to as "manual running".

As shown in FIG. 1, the robot system 1 includes the robot 10 and a robot control device 15. The robot 10 and the robot control device 15 are connected to each other wirelessly or by wire, so that transmission and reception of signals therebetween are allowed.

The robot 10 includes an arm part attached to a pedestal. The arm part has two or more joints, and each of the joints is provided with an actuator. The robot 10 moves the arm part by moving the actuators in accordance with a movement instruction received from the outside.

Attached to the distal end of the arm part is an end effector that is selected in accordance with contents of a work. The robot 10 is able to move the end effector in accordance with a movement instruction received from the outside.

A sensor for detecting movements of the robot 10, ambient environments of the robot 10, and the like, is attached to the robot 10. In this embodiment, a movement sensor 11, a force sensor 12, and a camera 13 are attached to the robot 10.

The movement sensor 11 is disposed at each joint of the arm part of the robot 10, and detects a rotation angle or an angular velocity of each joint. The force sensor 12 detects a force that is received by the robot 10 when the robot 10 moves. The force sensor 12 may be configured to detect a force acting on the end effector, or may be configured to detect a force acting on each joint of the arm part. The force sensor 12 may be configured to detect a moment instead of or in addition to a force. The camera 13 detects an image of a workpiece (the progress of a work on the workpiece) as a work object.

Data detected by the movement sensor 11 is movement data indicating a movement of the robot 10. Data detected by the force sensor 12 and the camera 13 are ambient environment data indicating ambient environments of the robot 10. Data that integrates the movement data and the ambient environment data may hereinafter be referred to as state data. The state data indicates states of the robot 10 and surroundings of the robot 10.

Hereinafter, the movement sensor 11, the force sensor 12, and the camera 13 provided to the robot 10 may be collectively referred to as "state detection sensors 11 to 13", Data detected by the state detection sensors 11 to 13 may be especially referred to as "sensor information". The state detection sensors 11 to 13 may be provided in the surroundings of the robot 10, instead of being attached to the robot 10.

The robot control device 15 includes a user interface section 20, a movement switching section (control data acquisition section) 30, an AI section 40, an AI parameter acquisition section 50, a completion rate monitoring section 56, a certainty factor monitoring section 57, a log identification information generation section 58, a movement log generation section 60, and a movement log storage section 70.

To be specific, the robot control device 15 is a computer including a CPU, a ROM, a RAM, and a HDD. The computer includes a device, such as a mouse, to be operated by the user. The computer preferably includes a GPU, because it allows learning through a neural network which will be described later to be performed in a short time. The HDD stores a program for moving the robot control device 15. Cooperation of the above-mentioned hardware and software allows the robot control device 15 to function as the user interface section 20, the movement switching section 30, the AI section 40, the AI parameter acquisition section 50, the completion rate monitoring section 56, the certainty factor monitoring section 57, the log identification information generation section 58, the movement log generation section 60, and the movement log storage section 70.

The robot control device 15 may be implemented by a single computer, or may be implemented by two or more computers operating in cooperation and communication with one another.

The user interface section 20 implements a user interface function of the robot control device 15. The user interface section 20 includes an operation section 21, a display section 22, and an evaluation value setting section 23.

The operation section 21 is a device used to manually operate the robot 10. The operation section 21 can be configured to have a lever, a pedal, and the like, for example.

The operation section 21 includes a sensor that detects an operating position of the operation section 21, though not shown. The operation section 21 further includes a known operation force detection sensor. The operation force detection sensor detects a force (operation force) that the user applies to the operation section 21.

In a case where the operation section 21 is configured to be capable of moving in various directions, the operation force may be a value containing the direction and magnitude of a force, as exemplified by a vector. The operation force may be detected not only as a force (N) applied by the user but also as an acceleration, which is a value linked with the force (i.e., a value obtained by dividing the force applied from the user by the mass of the operation section 21).

Hereinafter, the operation force that the user applies to the operation section 21 may be especially referred to as "user operation force". The user operation force that is outputted as a result of the user's operating the operation section 21 is converted into a movement instruction in the movement switching section 30, as will be described later.

The display section 22 is capable of displaying various types of information in accordance with user's instructions. The display section 22 may be a liquid crystal display, for example. The display section 22 is disposed near the operation section 21.

In a case of the operation section 21 being remote from the robot 10, the display section 22 may display an image of the robot 10 and surroundings of the robot 10.

The evaluation value setting section 23 is capable of setting an evaluation given by the user, with respect to a movement of the robot 10 described in a movement log read out from the movement log storage section 70. The movement log, and the like, will be described later.

The robot 10, the operation section 21, and the AI section 40 are connected to the movement switching section 30. The movement switching section 30 receives the user operation force outputted by the operation section 21 and a later-described presumed operation force outputted by the AI section 40.

The movement switching section 30 outputs a movement instruction for moving the robot 10 to the robot 10 and to the AI section 40. The movement switching section 30 includes a switching section 31 and a conversion section 32.

The switching section 31 is configured to output, to the conversion section 32, one of the user operation force or the presumed operation force received by the switching section 31. The switching section 31 is configured to output the user operation force or the presumed operation force to the conversion section 32 based on a selection signal indicating which of the user operation force or the select operation force is to be converted. In this manner, a state where the user moves the robot 10 (manual running) and a state where the robot system 1 causes the robot 10 to work autonomously (autonomous running) can be switched. In the manual running, the robot 10 moves based on the user operation force outputted by the operation section 21. In the autonomous running, the robot 10 moves based on the presumed operation force outputted by the AI section 40.

Whether the robot 10 is moved based on the user operation force or the presumed operation force can be selected automatically in accordance with whether or not the user is operating the operation section 21, based on a detection value from the above-described sensor that detects operations of the operation section 21. More specifically, when the user is substantially operating the operation section 21, the switching section 31 outputs the user operation force to the conversion section 32, or otherwise the switching section 31 outputs the presumed operation force to the conversion section 32.

The conversion section 32 converts either the user operation force or the presumed operation force received from the switching section 31 into a movement instruction for moving the robot 10, and outputs the movement instruction to the robot 10 and to the AI section 40. The movement instruction can also be called control data for controlling the robot 10.

The AI section 40 includes the learned model 43 that is created in order to cause the robot 10 to perform a series of works through autonomous movements. The model may be in any form. In this embodiment, a model based on a neural network is adopted. The creation (especially the initial creation) of the learned model 43 may be performed either in the robot control device 15 or in another computer.

The AI section 40 includes not only the learned model 43 but also a data input section 41 and a presumed data output section 42.

The data input section 41 functions as an interface on the input side of the AI section 40. The data input section 41 receives sensor information outputted from the state detection sensors 11 to 13.

The presumed data output section 42 functions as an interface on the output side of the AI section 40. The presumed data output section 42 is capable of outputting data based on a model that the AI section 40 has created through machine learning, In this embodiment, the AI section 40 learns operations of the robot 10 that are performed by the user via the operation section 21, and creates the learned model 43. More specifically, the AI section 10 receives the sensor information from the state detection sensors 11 to 13 as well as the operation force that the user has applied to the operation section 21 at a time corresponding to the sensor information.

The learned model 43 adopted in the AI section 40 may be in any form. The learned model 43 of this embodiment is a neural network having a general configuration with an input layer, a hidden layer, and an output layer. In each of the layers, two or more units that mimic brain cells are arranged. The hidden layer is disposed between the input layer and the output layer, and the hidden layer includes an appropriate number of intermediate units. Information flows through the input layer, the hidden layer, and the output layer in this order. The number of hidden layers is set as appropriate.

In this model, data (input data) received by the input layer is the sensor information mentioned above. As described above, the sensor information is data indicating the states of the robot 10 and surroundings of the robot 10. Data (output data) outputted by the output layer is an operation force as a presumed user operation force. This operation force can be considered as data indicating a presumed human operation.

Each input unit and each intermediate unit are coupled by a path through which information flows. Each intermediate unit and each output unit are coupled by a path through which information flows. In each of the paths, an influence (weight) that information from an upstream unit has on a downstream unit is set.

In a learning phase, the AI section 40 inputs sensor information to a model, and an operation force outputted from the model is compared against the user operation force (supervised learning). The AI section 40 updates the above-mentioned weight by back propagation, which is a known algorithm, such that an error obtained in the foregoing manner can be reduced. Continuously performing this process can implement learning.

In a presuming phase after creation of the learned model 43, the AI section 40 inputs sensor information to the learned model 43, and an operation three outputted from the learned model 43 is outputted as a presumed operation force to the movement switching section 30.

In a case where the switching section 31 outputs the presumed operation force received from the AI section 40 to the conversion section 32, the movement switching section 30 generates control data based on the presumed operation force. In this case, the movement switching section 30 functions as a control data acquisition section that acquires control data for causing the robot 10 to perform a work based on the output from the AI section 40.

The user is able to make the AI section 40 create the learned model 43 for use to cause the robot 10 to perform a series of works for inserting a workpiece into an opening of a member, for example.

Figure 2:
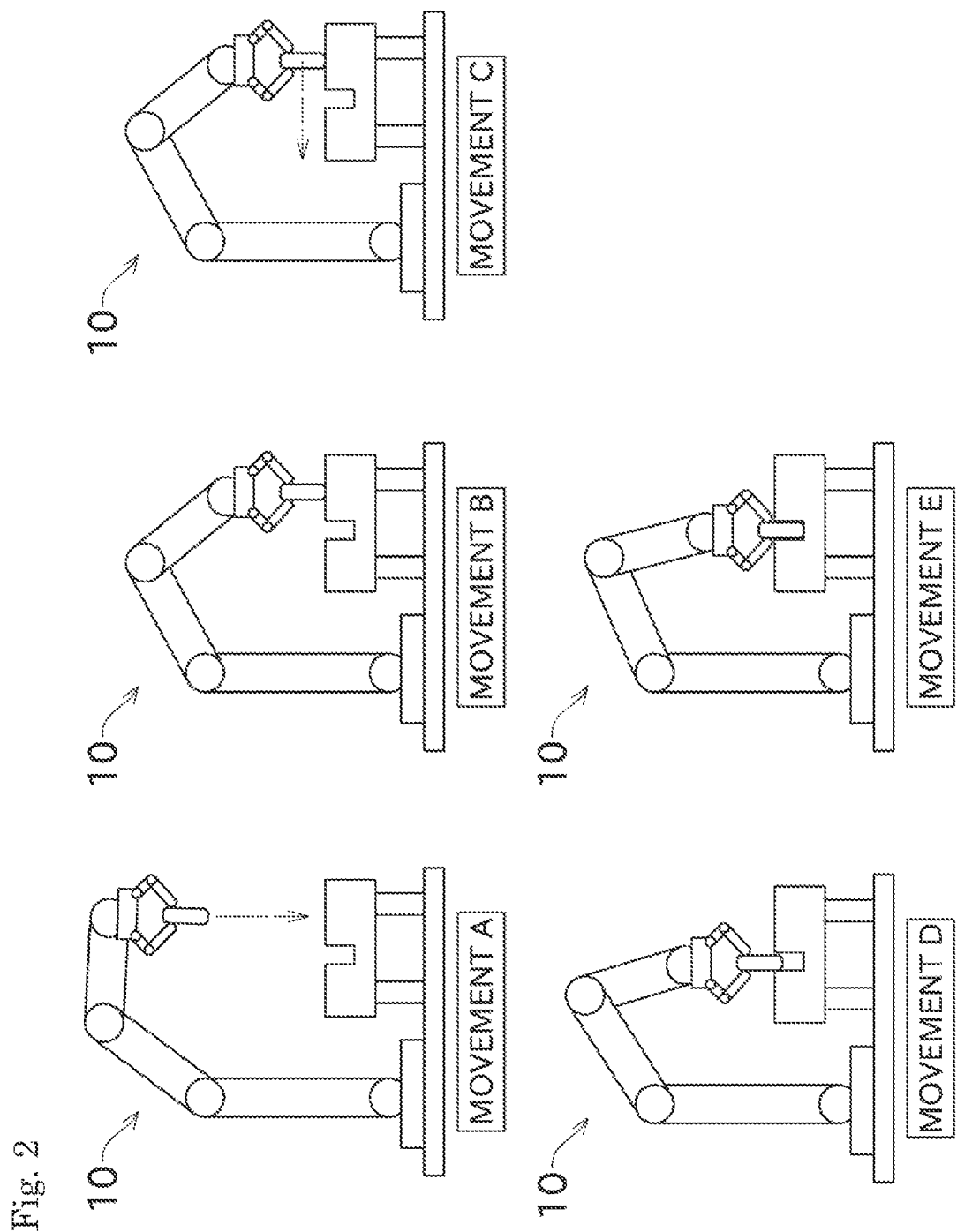

To be specific, the user operates the operation section 21, to move the robot 10 in the following manner, for example. Referring to FIG. 2, movement A includes: making the robot 10 hold a workpiece; in this state, placing the workpiece above a member; and bringing the workpiece closer to a surface of the member. Movement B includes moving the workpiece as it is, to bring the workpiece into contact with the surface of the member. Movement C includes moving the workpiece toward the position of an opening. Here, in this movement of the workpiece, the workpiece is kept in contact with the surface of the member. Movement D includes bringing an end portion of the workpiece into contact with an inner wall of the opening. Movement E includes inserting the workpiece into the opening.

The user operates the robot 10 so as to make the robot 10 move in order from movement A to movement E. The relationship between the sensor information and the user operation force during this process is learned, and thereby the AI section 40 is able to create the learned model 43 capable of making the robot 10 autonomously move in order from movement A to movement E.

The AI parameter acquisition section 50 is able to acquire various parameters obtained when the learned model 43 of the AI section 40 outputs the presumed operation force, by requesting them from the AI section 40. These parameters are parameters to which human can give meanings in relation to the autonomous work of the robot 10. In many cases, the reason why the learned model 43 presumes an output based on an input cannot be explained. These parameters are therefore important in that they provide a clue to making the user understand and convinced of the movement of the robot 10 presented by the learned model 43.

As these parameters, the AI parameter acquisition section 50 acquires a completion rate, a certainty factor, and a soundness factor. The AI parameter acquisition section 50 correspondingly includes a completion rate acquisition section 51, a certainty factor acquisition section 52, and a soundness factor acquisition section 53.

The completion rate acquisition section 51 acquires a completion rate. The completion rate is a parameter used to evaluate to which progress level in a series of works the movement that the robot 10 performs based on the output from the learned model 43 corresponds. In this embodiment, the completion rate takes a value in a range of 0 to 100. A value closer to 100 indicates a more progress in the series of works.

Figure 3:
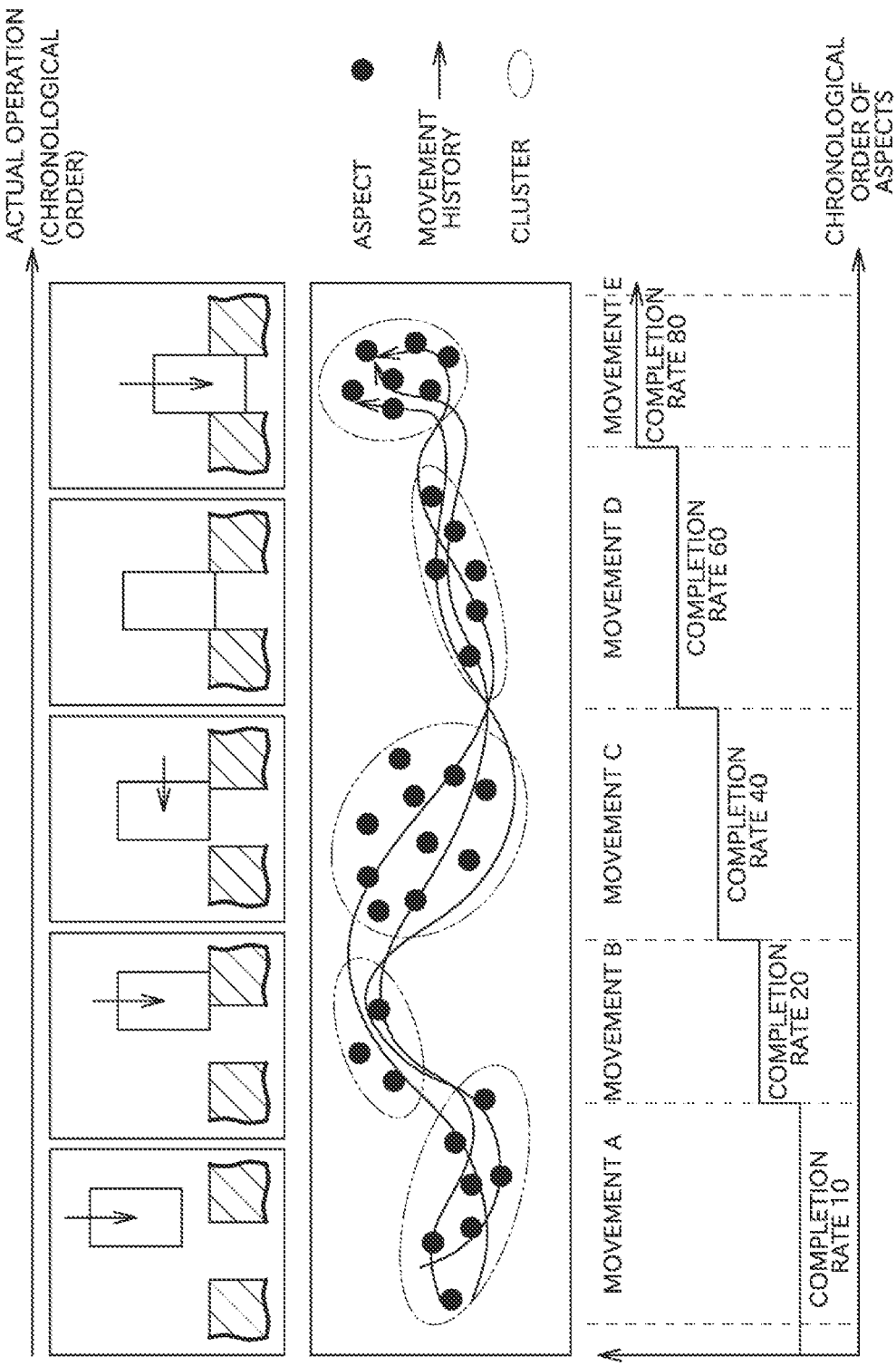

Referring to FIG. 3, calculation of the completion rate will be described. In this embodiment, as shown in FIG. 3, the completion rate is calculated in consideration of clusters obtained by clustering the states of the robot 10 that can be acquired chronologically and a movement history of the robot 10.

Each of the states of the robot 10 mentioned above can be expressed as a multi-dimensional vector (characteristic vector) containing the sensor information of the state detection sensors 11 to 13 and the presumed operation force presumed by the learned model 43. The characteristic vector changes variously in the course of the robot 10 performing the series of works. The characteristic vector may contain not only the values of the sensor information and the presumed operation force at the current point of time but also a past history of the sensor information and the presumed operation force.

Hereinafter, an integration of the states of the robot 10 and surroundings of the robot 10 with a result of presumption that the learned model 43 has made in accordance with the states of the robot 10 and surroundings of the robot 10 may be called an aspect of the robot 10. Data (aspect data) indicating an aspect of the robot 10 is used as the characteristic vector mentioned above. The aspect data corresponds to an integration of input data and output data of the learned model 43.

Clustering is a type of unsupervised learning, and is a technique of acquiring two or more clusters, each of which is a group of data pieces having similar characteristics, by learning distribution rules based on a large number of data pieces. As a clustering method, a known non-hierarchical clustering technique can be used as appropriate.

Aspects of the robot 10 have different characteristics for the different movements (movement A to movement E) described above. For example, characteristics in the state of movement A (i.e., aspect data acquired in movement A) are different from characteristics in the state of movement B. Therefore, appropriately clustering the above-mentioned characteristic vectors serving as objects of the clustering can classify the aspects of the robot 10 according to movements.

The AI section 10 uses a result of the clustering to calculate a completion rate corresponding to the current aspect of the robot 10. As shown in FIG. 3, completion rate values are set in advance so as to increase stepwise and cumulatively according to the order of movements indicated by respective clusters. Since the series of works performed by the robot 10 can be expressed as characteristic vectors arranged in a chronological order, information which is in this chronological order can be used to obtain a chronological order of the clusters.

The AI section 40 obtains, by computation, to which cluster the characteristic vector indicating the current aspect of the robot 10 belongs, and outputs a completion rate corresponding to this cluster in response to a request from the AI parameter acquisition section 50. To which cluster the characteristic vector belongs can be identified by, for example, obtaining a distance between the center of gravity of each cluster and the characteristic vector and selecting a cluster whose center of gravity is at the shortest distance from the characteristic vector.

Figure 4:
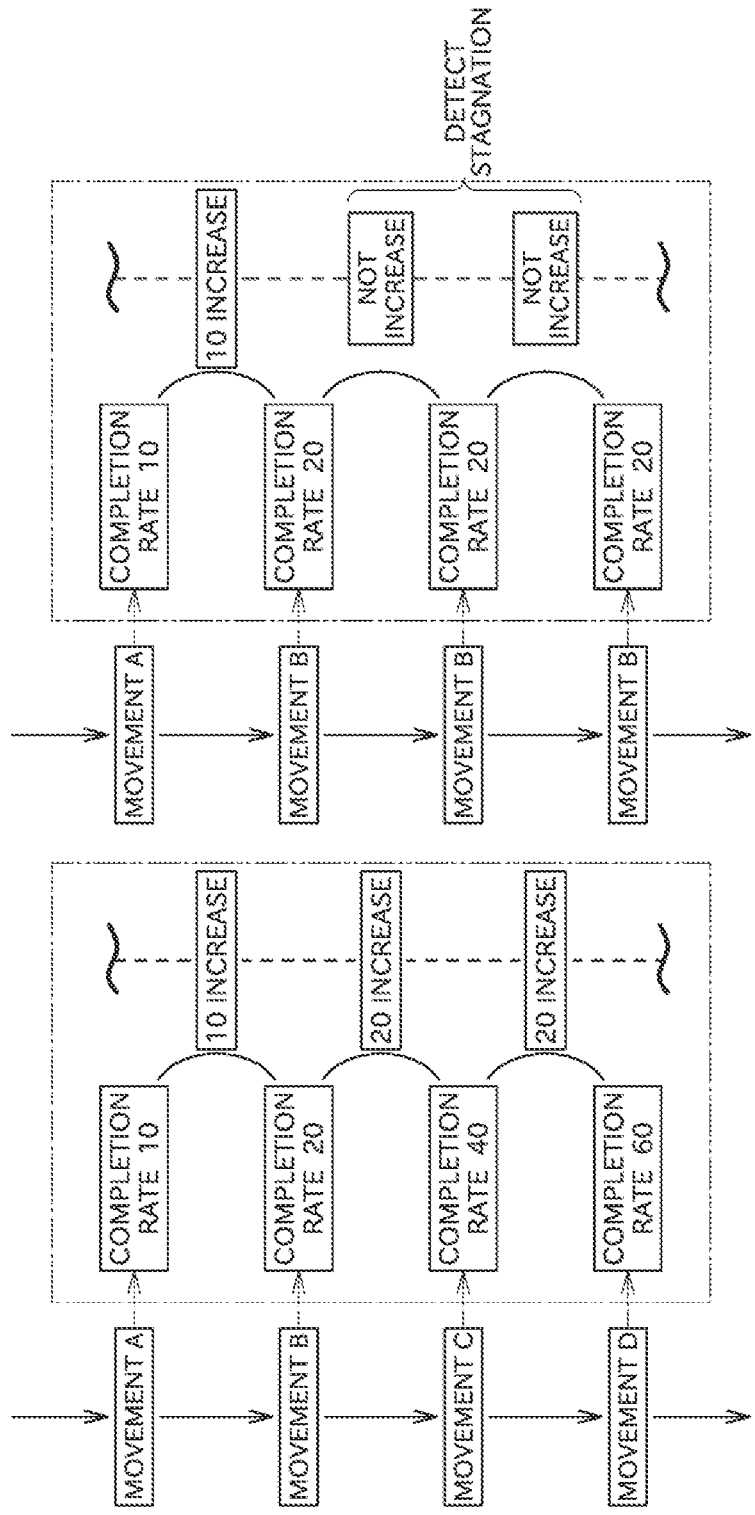

As shown in FIG. 4, if the works by the robot 10 are advancing (that is, if the aspect of the robot 10 is transitioning properly), the value of the completion rate increases as time elapses. If the works by the robot 10 are not advancing (for example, if a transition to a specific aspect is repeated), the value of the completion rate does not increase even though time elapses. The user, therefore, can easily grasp whether or not the autonomous work by the robot 10 is advancing, by seeing a change in the completion rate. As a result, the user can easily find stagnation of the movement of the robot 10, and thus can take proper measures such as correction of the movement.

The certainty factor acquisition section 52 acquires a certainty factor. The certainty factor is a parameter used to evaluate whether or not a movement of the robot 10 is probable (in other words, whether or not an output presumed by the learned model 43 is probable).

The learned model 43 of the AI section 40 has learned in advance the correspondence relationship of states of the robot 10 and surroundings of the robot 10 to a user operation force applied by the user's operation performed at that time. In other words, the learned model 43 operates based on rules obtained from a large number of given states. It is expected that a generalization ability that is inherent in a machine learning model will allow the learned model 43 to output a proper presumed operation force even in an unknown situation. In this respect, however, if a person is thrown into a completely unfamiliar situation that can be hardly predicted based on past experiences, it would not be easy for the person to behave with certainty. In the same way, from the viewpoint of the learned model 43, the farther a state is from the given states that the learned model 43 has learned, the more difficult it would be for the learned model 43 to be certain about a result of the presumption. In this sense, the certainty factor indicates a probability of the presumption.

In this embodiment, in the AI section 40, a probabilistic discriminator for discriminating an aspect of the robot 10 is created by machine learning. The probabilistic discriminator comprises two or more probabilistic discriminators according to the number of clusters that are classified by the above-described clustering.

For example, the probabilistic discriminator corresponding to the cluster of movement A undergoes machine learning such that the probabilistic discriminator outputs a value close to 100 if receiving a characteristic vector classified into the cluster of movement A as a result of the clustering, and outputs a value close to 0 if receiving a characteristic vector classified into a cluster of another movement as a result of the clustering. That is, if a probabilistic discriminator having undergone learning receives a characteristic vector indicating the current aspect of the robot 10, the probabilistic discriminator outputs a value indicating whether or not the aspect is probably movement A. This value can be considered as substantially representing a probability (presumption probability) that the current aspect of the robot 10 is movement A. The probabilistic discriminators corresponding to the other clusters (the other movements B to E) also undergo learning in the same manner as above.

Inputting a characteristic vector to each of the two or more probabilistic discriminators makes it possible to obtain to which one of movements A to E the current situation is presumed to correspond and to obtain whether or not that presumption is probable, based on the probabilistic discriminators.

Figure 5:
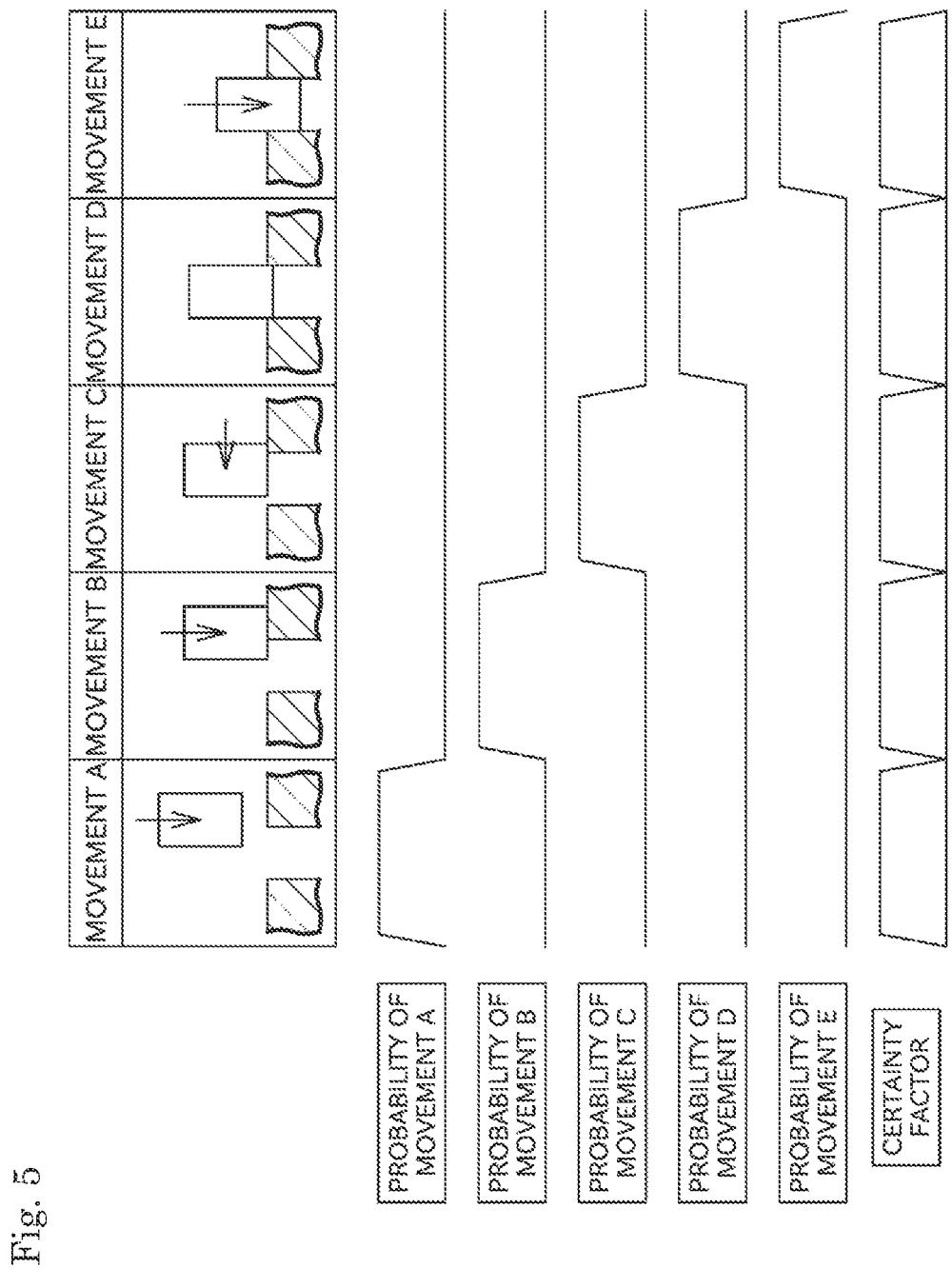

In this embodiment, as shown in FIG. 5, the largest value among presumption probabilities outputted by the two or more probabilistic discriminators is used as the certainty factor. If the current aspect is similar to a given aspect (in other words, an aspect that is classified into any of movements A to E as a result of the clustering) of the robot 10, the certainty factor has a large value. On the other hand, if the current aspect is not similar to a given aspect of the robot 10, the certainty factor has a small value.

Figure 6:
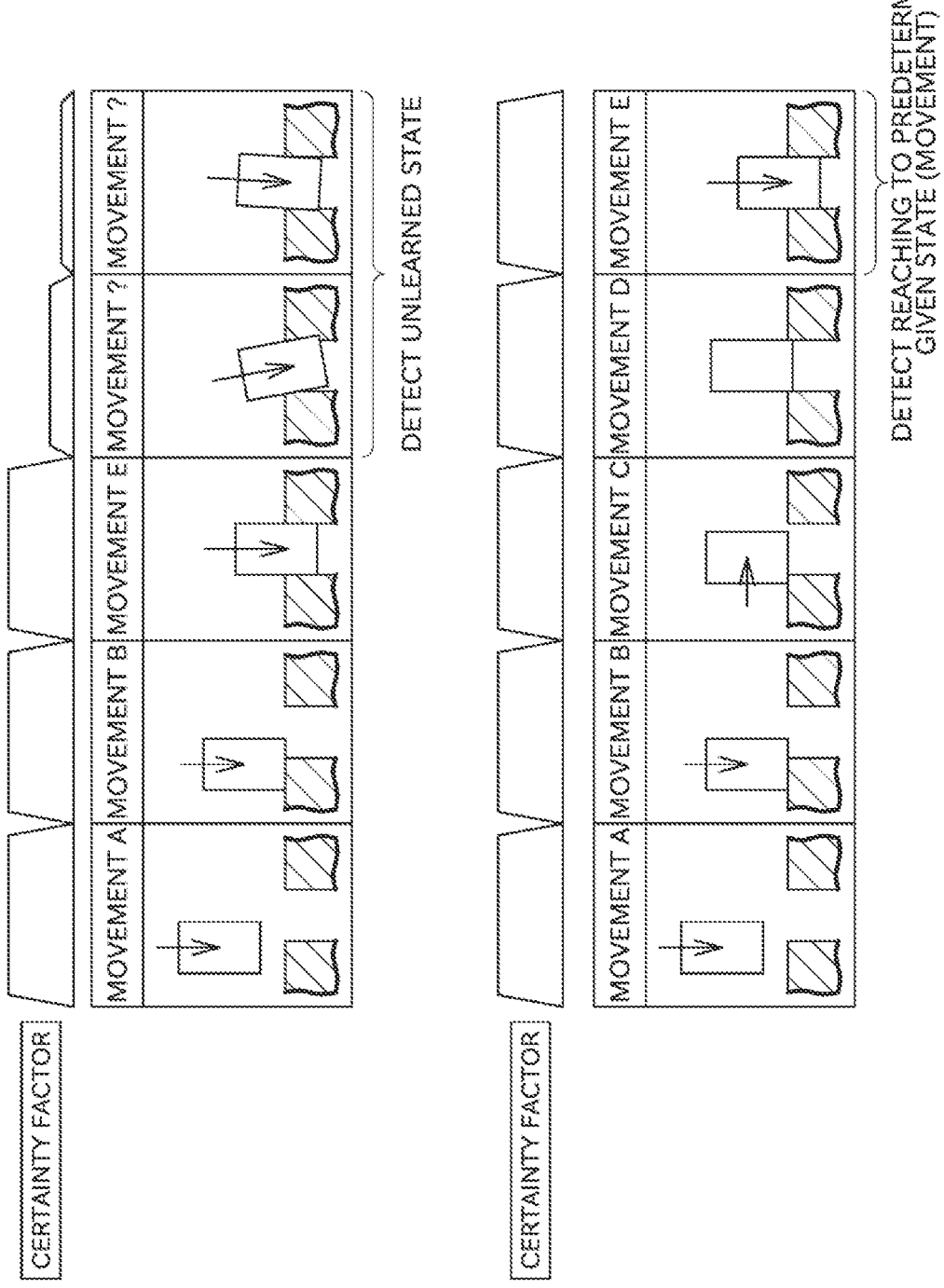

As shown in FIG. 6, the user is able to evaluate whether or not a movement of the robot 10 is probable, by seeing the value of the certainty factor during the series of works, for example. To be specific, in a case of performing a movement that is not memorized by the learned model 43, the value of the certainty factor decreases. This allows the user to grasp that a movement that has not been sufficiently learned is included in the series of works. It may be conceivable that a movement assigned a low certainty factor is automatically detected by the robot control device 15. In a case of performing a movement that is memorized by the learned model 43, the value of the certainty factor increases. Accordingly, the user is able to recognize that a movement of the robot 10 in an aspect agrees with a given movement.

The user is also able to confirm that a movement of the robot 10 has reached a given state (e.g., any of movements A to E), by using the value of the certainty factor.

The soundness factor acquisition section 53 acquires a soundness factor. The soundness factor is a parameter indicating the degree to which a state recognized by the learned model 43 is preferable for the user. In this embodiment, the soundness factor takes a value in a range of 0 to 100. A value closer to 100 indicates that the aspect is more preferable for the user.

The soundness factor is a parameter used to artificially influence a probability or weight, where the probability or weight represents the degree of easiness in transitioning to each of branch movements branched from a movement in the learned model 43.

Figure 7:
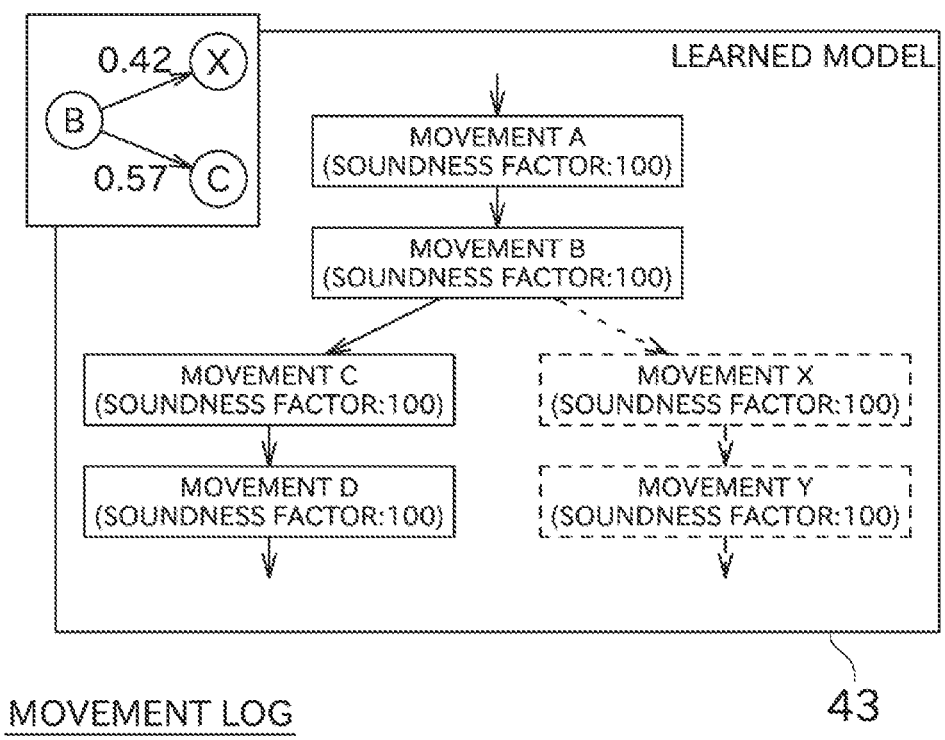

As shown in FIG. 7, the learned model 43 is able to express a state transition (in other words, a transition from a movement to a movement). At a branch point where a transition of movement can occur, the degree of easiness in transitioning to each movement is substantially represented by a weight. In the example shown in FIG. 7, a weight related to a transition from movement B to movement X is 0.42, and a weight related to a transition from movement B to movement C is 0.57. In this example, therefore, a transition of movements A, B, C, and D is easier than a transition of movements A, B, X, and Y.

Each movement of the robot 10 is assigned a soundness factor. Via the value of the soundness factor, the user is able to create the learned model 43 with a transition of movements of the robot 10 (i.e., the probability or weight mentioned above) adjusted, as will be detailed later. Referring to FIG. 7, in an initial state, the values of soundness factors related to all the movements are 100. The user is able to create the learned model 43 with a transition of movements of the robot 10 adjusted, by lowering the value of the soundness factor related to an unpreferable movement.

The completion rate monitoring section 56 shown in FIG. 1 monitors a completion rate acquired by the completion rate acquisition section 51 mentioned above. As shown in FIG. 4, the completion rate monitoring section 56 is able to detect a situation where the completion rate remains unchanged for a predetermined period, to thereby detect stagnation of a movement of the robot 10.

If the completion rate monitoring section 56 detects stagnation of a movement of the robot 10, the robot control device 15 may stop controlling the robot 10 and perform a process of ceasing a work performed by the robot 10. This can provide a timeout function (a function for abandoning the continuation of the work) that is based on a result of monitoring by the completion rate monitoring section 56.

If the completion rate monitoring section 56 detects stagnation of a movement of the robot 10, the robot control device 15 may control the robot 10 such that a work having changed settings is applied from a halfway point. This can provide a retry function that is based on a result of monitoring by the completion rate monitoring section 56.

The certainty factor monitoring section 57 monitors a certainty factor acquired by the certainty factor acquisition section 52. The certainty factor monitoring section 57 constantly monitors the value of the certainty factor, and thereby can detect a movement whose certainty factor value does not reach a predetermined value, as shown in FIG. 6. Thus, the certainty factor monitoring section 57 is able to detect a movement that has not been sufficiently learned (in other words, an aspect for which additional learning is highly necessary). To perform additional learning, the user can easily grasp at which point the additional learning should be started, based on a result of monitoring by the certainty factor monitoring section 57.

The log identification information generation section (input data identification information generation section) 58 generates information indicating data received by the learned model 43 when the certainty factor is equal to or less than a predetermined value. This allows the user to easily grasp in which aspect insufficient learning occurs. This information may be, for example, a log ID which will be described later.

The movement log generation section 60 generates a movement log. Described in the movement log are various types of information obtained when the robot 10 is autonomously moved. The movement log can contain, for example, the above-mentioned sensor information, presumed operation force, movement instruction, and the like. In the movement log, diversified types of information are described for each aspect of the robot 10. Each of the aspects described in the movement log is given identification information (log ID) that can uniquely identify the aspect, though not shown.

The movement log may contain information related to at least any of the completion rate, the certainty factor, or the soundness factor outputted by the AI parameter acquisition section 50. With this configuration, the user is able to evaluate a movement of the robot 10 based on the completion rate, etc, contained in the movement log. For example, the user can easily understand a trace of works performed by the robot 10 from the viewpoint of the completion rate. The user can also easily understand a similarity to a specific movement from the viewpoint of the certainty factor.

The movement log storage section 70 stores the movement log generated by the movement log generation section 60. The movement log thus stored can be displayed by the display section 22 in response to the user's appropriately operating the user interface section 20.

In this embodiment, the AI section 40 is able to re-create the learned model 43 in consideration of an evaluation from the user. In the following, re-creation of a learned model will be described with reference to FIG. 7, etc.

The robot 10 autonomously moves based on an output from the learned model 43, and as a result, a movement log is obtained. Then, the user can partially set an evaluation value to the movement log, as shown in FIG. 7. The evaluation value is a result of evaluating whether the movement of the robot 10 is good or bad, the evaluation being made from the viewpoint of the user. The setting can be made by using the evaluation value setting section 23 included in the user interface section 20.

FIG. 7 shows an example in which the evaluation value is set in the movement log. In FIG. 7, contents of the movement log are expressed in a very simplified manner. The user selects OK for a portion that the user has evaluated as good, and selects NG for a portion that the user has evaluated as bad. It is preferable that the value of the soundness factor be contained in the movement log, because it allows the user to select OK or NG with reference to the value of the soundness factor.

Figure 8:
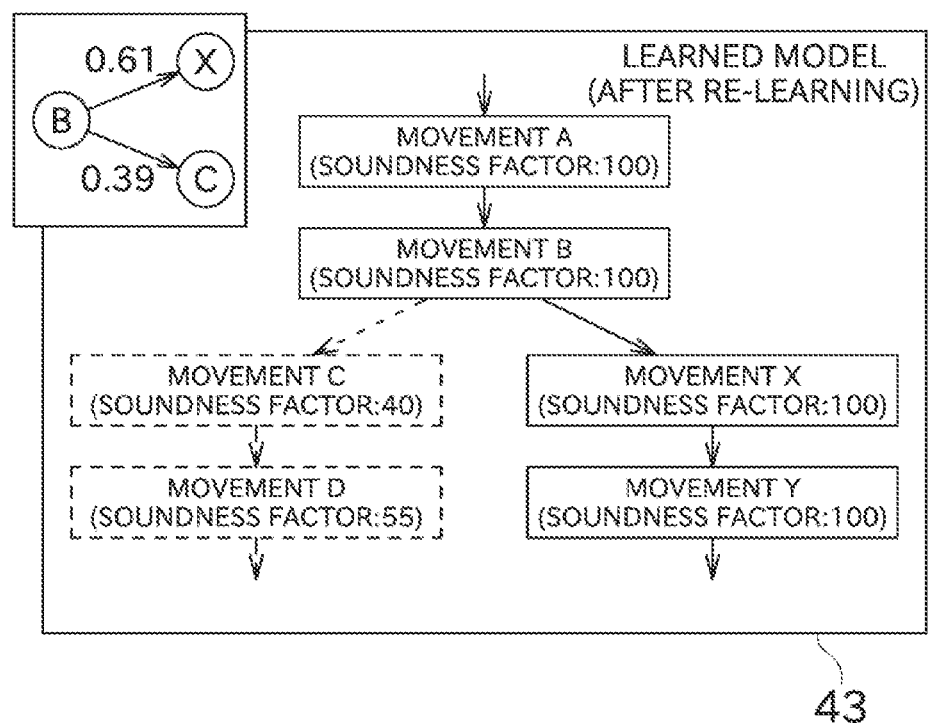

After selecting the evaluation value, the user performs a predetermined operation to instruct that the learned model 43 be re-created. The AI section 40 firstly lowers the value of a soundness factor related to a movement for which NG is selected as the evaluation value, while maintaining the value of a soundness factor related to a movement for which OK is selected as the evaluation value. Then, the learned model 43 is re-created. In the re-created learned model 43, as shown in FIG. 8, the above-described weight, which indicates the degree of easiness in transitioning to a movement, is adjusted such that the probability of transitioning to a movement having a higher soundness factor increases and the probability of transitioning to a movement having a lower soundness factor decreases. This makes it likely that a transition desirable for the user is preferentially selected. Consequently, the customizability is improved, and the learned model 43 that is more convincing to the user can be obtained.

Next, another example of how to utilize the completion rate and the certainty factor will be described.

The robot control device 15 of this embodiment is able to deal with a series of movements implemented by the single learned model 43 while substantially separating a part of the movements from the rest of the movements.

Figure 9:
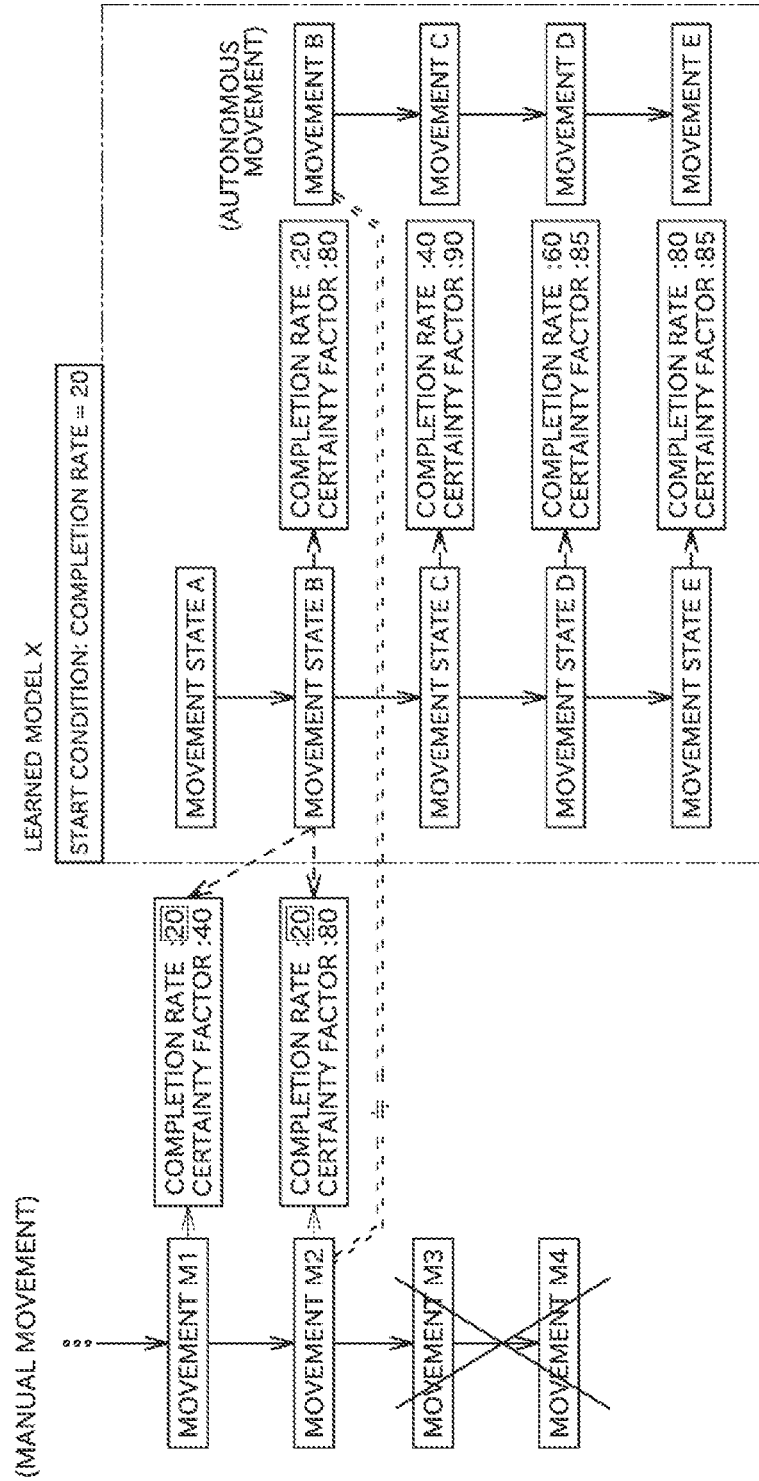

First, a case of starting an autonomous movement in the middle of a series of movements will be described with reference to FIG. 9. The user sets in advance a condition for the learned model 43 (in FIG. 9, indicated as the learned model X) to start an autonomous movement. The condition is set in the form of a completion rate. In an example shown in FIG. 9, the completion rate being 20 is set as the condition for starting the autonomous movement.

Then, the user operates the operation section 21 to move the robot 10 in the order of movements M1, M2, . . . . Movements M1, M2, . . . represent a process of movements in manual running. At this time, the AI parameter acquisition section 50 requests, from the AI section 40, a completion rate and a certainty factor corresponding to each aspect (here, a user operation force is used instead of a presumed operation force) of the robot 10.

In the aspect of movement M1, the obtained completion rate is 20, which satisfies the completion rate condition for starting the autonomous movement. This means that the aspect of movement M1 is determined as being somewhat similar to the aspect of movement B (the movement at which the completion rate reaches 20) of the learned model X. The certainty factor is as low as 40, however. In this stage, therefore, an autonomous operation of the AI section 40 is not started.

In the aspect of next movement M2, the obtained completion rate is 20, which satisfies the completion rate condition for starting the autonomous movement. The certainty factor is as high as 80, and thus the probability is good. Only when the completion rate satisfies the condition and additionally the certainty factor is equal to or greater than a predetermined value like in the above-described case, the AI section 40 starts the output based on the learned model 43, starting from movement B corresponding to this completion rate. In conjunction with this, the movement switching section 30 switches the control from the control based on the user operation force to the control based on the presumed operation force. Thereafter, movements C, D, and F are performed by the autonomous movement of the robot 10.

In this manner, it is possible to substantially take out only movements B to E from the learned model 43 having learned to perform a series of works including movements A to E, to start a control in the middle of the series of works.

Figure 10:
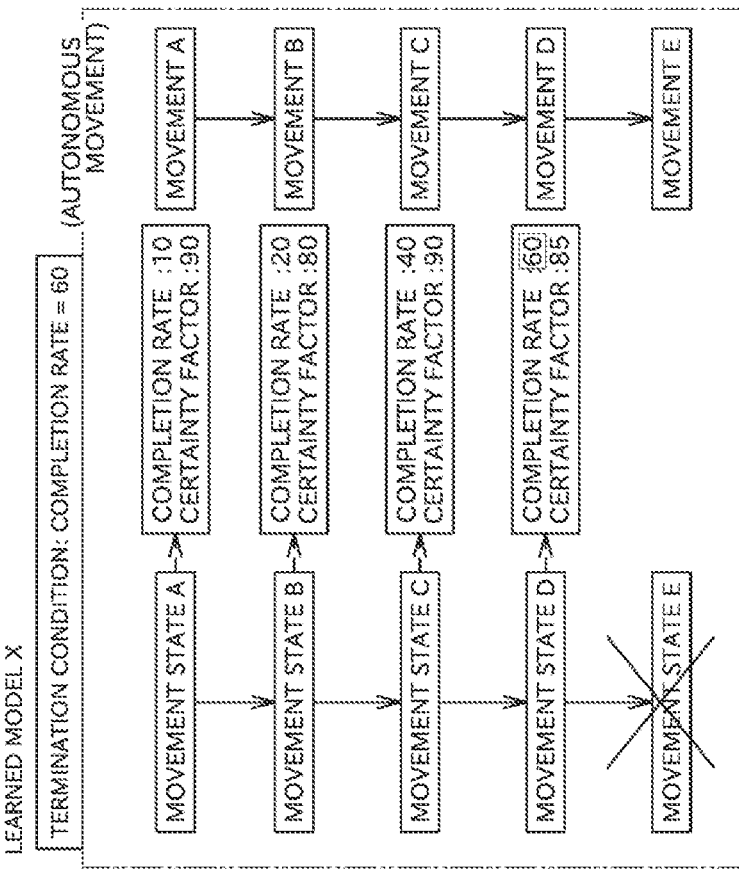

Next, a case of terminating an autonomous movement in the middle of a series of movements will be described with reference to FIG. 10. The user sets in advance a condition for the learned model X to terminate an autonomous movement. The condition is set in the form of a completion rate. In an example shown in FIG. 10, the completion rate being 60 is set as the condition for terminating the autonomous movement.

The AI section 40 causes an autonomous movement of the robot 10 in the order of movement A, movement B, . . . . In this process, the AI parameter acquisition section 50 requests, from the AI section 40, a completion rate and a certainty factor corresponding to each aspect of the robot 10.

In the aspect of movement D, the obtained completion rate is 60, which satisfies the completion rate condition for terminating the autonomous movement. The certainty factor is as high as 85, and thus the probability is good. Only when the completion rate satisfies the condition and additionally the certainty factor is equal to or greater than a predetermined value like in the above-described case, the AI section 40 terminates the output based on the learned model 43, by ending with movement D corresponding to this completion rate. Thus, movement E is not performed.

In this manner, it is possible to substantially take out only movements A to D from the learned model 43 having learned to perform a series of works including movements A to E, to perform a control only up to the middle of the series of works.

Coupling autonomous movements based on two different learned models 43 will now be described with reference to FIG. 11.

Figure 11:
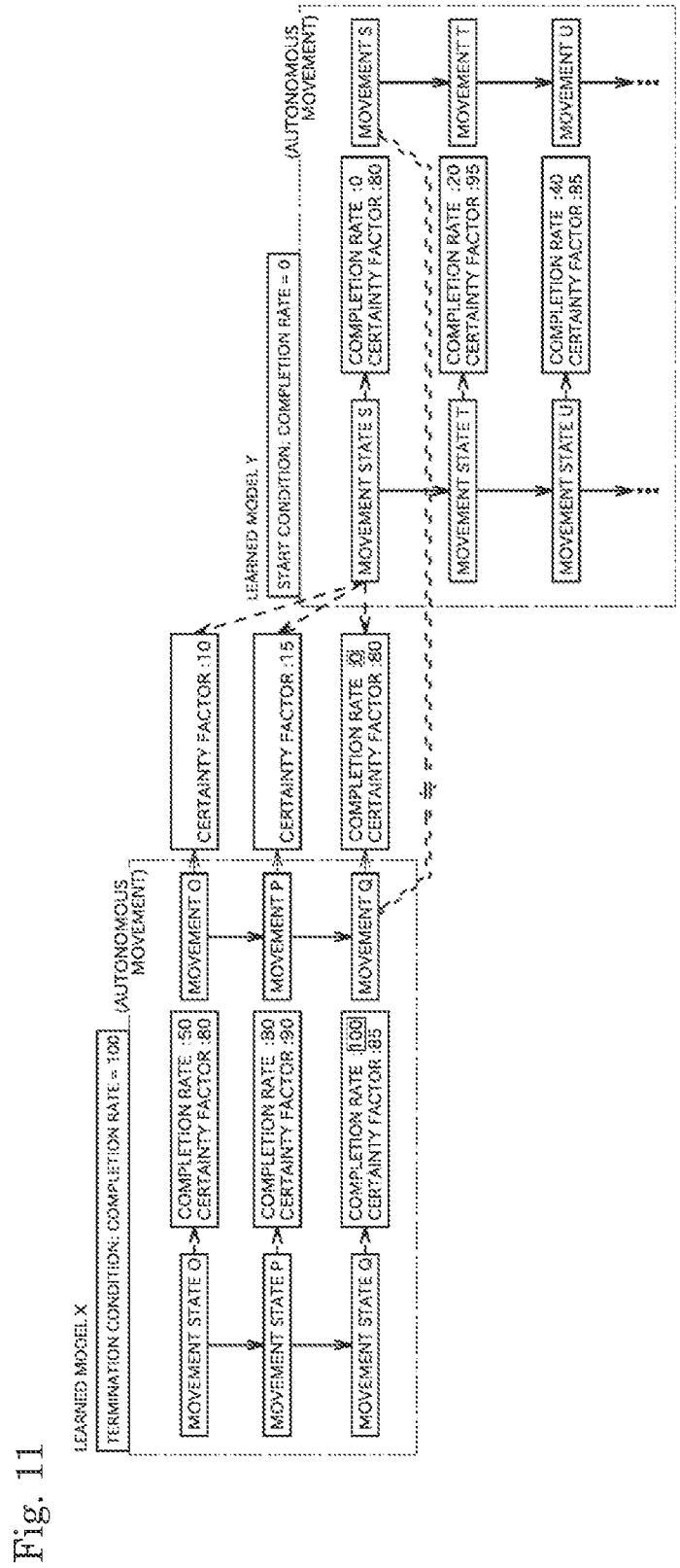

In an example shown in FIG. 11, the robot control device 15 creates two different learned models 43. In the following description, one of the learned models 43 may be referred to as learned model X, and the other of the learned models 43 may be referred to as learned model Y. The learned model X has learned in advance a series of works including movements O to Q. The learned model Y has learned in advance a series of works including movement S and subsequent movements.

Before coupling autonomous movements based on the two learned models 43, the robot control device 15 verifies termination of the autonomous movement based on the learned model X and start of the autonomous movement based on the learned model Y. The completion rate and the certainty factor are used for this verification.

In the example shown in FIG. 11, with respect to the learned model X, the completion rate being 100 is set as a condition for terminating the autonomous movement. With respect to the learned model Y, the completion rate being 0 is set as a condition for starting the autonomous movement.

Based on the output from the learned model X, the AI section 40 causes an autonomous movement of the robot 10 in the order of movement O, movement P, . . . . In this process, the AI parameter acquisition section 50 requests, from the AI section 40, a completion rate and a certainty factor corresponding to each aspect of the robot 10, for each of the learned models X and Y.

In the aspect of movement Q, as for the learned model X, the obtained completion rate is 100, which satisfies the completion rate condition for terminating the autonomous movement. The certainty factor is as high as 85, and thus the probability is good. In the aspect of movement Q, as for the learned model Y, the completion rate is 0, which satisfies the completion rate condition for starting an autonomous movement. The certainty factor is as high as 80, and thus the probability is good.

In this manner, the learned model 43, which outputs a presumed operation force to be used for the autonomous movement, is switched on condition that the certainty factors in both of the learned models X and Y are at predetermined levels or higher. At a timing of movement Q, the AI section 40 switches the learned model 43 from the learned model X to the learned model Y with a succession of the autonomous movement. As a result, a series of movements, namely, movement O, movement P, movement Q (≈movement S), movement T, movement U, . . . is performed.

By using the values of the completion rate and the certainty factor, the robot control device 15 is able to transfer movements between two different models, so that a series of works (coupled works) can be performed by the robot 10.

As thus far described, the robot control device 15 according to this embodiment includes the learned model 43, the movement switching section 30, the completion rate acquisition section 51, and the certainty factor acquisition section 52. The learned model 43 is created through learning work data composed of input data and output data. The input data includes situations of the robot 10 and surroundings of the robot 10 in a case where human operates the robot 10 to cause the robot 10 to perform a series of works. The output data includes a human operation corresponding to the case or a movement of the robot 10 caused by the human operation. The movement switching section 30 acquires control data on the robot 10 used to make the robot 10 perform the works, the acquisition being made by obtaining output data related to a human operation from the learned model 43, the human operation being presumed in response to and in accordance with input data received by the learned model 43, the input data being related to situations of the robot 10 and surroundings of the robot 10. The completion rate acquisition section 51 acquires a completion rate indicating to which progress level in the series of works the output data outputted by the learned model 43 corresponds. The certainty factor acquisition section 52 acquires a certainty factor indicating a probability of the presumption in a case where the learned model 43 outputs the output data in response to the reception of the input data.

In this embodiment, the robot is controlled by a robot control method including a control data acquisition step, a completion rate acquisition step, and a certainty factor acquisition step, described as follows. In the control data acquisition step, control data on the robot used to make the robot perform the works is acquired by obtaining output data related to a human operation from the learned model 43, the human operation being presumed in response to and in accordance with input data received by the learned model 43, the input data being related to situations of the robot 10 and surroundings of the robot 10. In the completion rate acquisition step, a completion rate is acquired, the completion rate indicating to which progress level in the series of works the output data outputted by the learned model 43 corresponds. In the certainty factor acquisition step, a certainty factor is acquired, the certainty factor indicating a probability of the presumption in a case where the learned model 43 outputs the output data in response to the reception of the input data.

Based on the completion rate and the certainty factor thus acquired, the reason why the learned model 43 has made such an output in response to the input can be inferred to some extent by the user. As a result, the blackboxness which is conventionally inherent in the learned model 43 can be reduced, so that the user can apply the learned model 43 to a robot control with a sense of conviction. In addition, the user can examine the learning more appropriately, by using the acquired completion rate and certainty factor as a clue. For example, the user can easily grasp how the contents learned by the learned model 43 should be corrected, based on the acquired completion rate and certainty factor.

The robot control device 15 according to this embodiment further includes the completion rate monitoring section 56 that monitors the completion rate acquired by the completion rate acquisition section 51.

This allows the robot control device 15 to easily determine whether or not the works performed by the robot 10 are progressing favorably.

If, as a result of monitoring by the completion rate monitoring section 56, the completion rate is continuously kept less than a predetermined value for a predetermined period or longer, the robot control device 15 according to this embodiment stops controlling the robot 10 in the middle of the works.

This can prevent a wasteful movement.

If, as a result of monitoring by the completion rate monitoring section 56, the completion rate is continuously kept less than a predetermined value for a predetermined period or longer, the robot control device 15 according to this embodiment controls the robot 10 such that works having changed settings are applied from a halfway point.

This can prevent a wasteful movement, and can automatically resume the works.

In the robot control device 15 according to this embodiment, the completion rate is obtained based on a result of clustering aspect data pieces that are data pieces including states of the robot 10 and surroundings of the robot 10, the states being chronologically acquired.

Accordingly, although the state of the robot 10 and surroundings of the robot 10 changes from moment to moment in the course of the series of works, the completion rate can be obtained in consideration of characteristics of each state. Consequently, a progress rate that properly represents a progress level can be acquired.

The robot control device 15 according to this embodiment further includes the certainty factor monitoring section 57 that monitors the certainty factor acquired by the certainty factor acquisition section 52.

This can make it easy for the robot control device 15 to determine whether or not a situation that cannot be easily expected by the existing learning is occurring.

The robot control device 15 according to this embodiment generates information indicating the input data received by the learned model 43 when the certainty factor is equal to or less than a predetermined value.

This can make it easy to prepare information, etc. necessary for additional learning, for example.

The robot control device 15 according to this embodiment is able to start controlling the robot 10 based on the output data outputted by the learned model 43, from a state where the certainty factor is equal to or greater than a predetermined value, the state corresponding to a halfway point in the series of works.

Since it is possible that the works learned by the learned model 43 are performed only partially, the scope of use of the learned model 43 can be widened. Moreover, whether or not to use the output from the learned model 43 is switched only in a situation having a large certainty factor, and therefore it is less likely that a movement of the robot 10 unexpected by the user is performed.

The robot control device 15 according to this embodiment is able to terminate the control of the robot 10 based on the output data outputted by the learned model 43, in a state where the certainty factor is equal to or greater than a predetermined value, the state corresponding to a halfway point in the series of works.

Since it is possible that the works learned by the learned model 43 are performed only partially, the scope of use of the learned model 43 can be widened. Moreover, whether or not to use the output from the learned model 43 is switched only in a situation having a large certainty factor, and therefore a movement of the robot 10 unexpected by the user is less likely to be performed.

The robot control device 15 according to this embodiment is able to acquire control data on the robot 10 used to make the robot 10 perform the works based on the output data outputted by two or more learned models 43 that are created each corresponding to each of different series of works. The robot control device 15 is able to control the robot 10 such that the robot 10 performs coupled works in which the different series of works are chronologically coupled, by successively performing controls of the robot 10 based on the output data outputted respectively by the two or more learned models 43, a boundary between the successive controls being a state where the certainty factor is equal to or greater than a predetermined value.

This makes it easy to perform a complicated movement of the robot 10. In addition, a to-be-used output of the learned model 43 is switched only in a situation having a large certainty factor, and therefore a movement of the robot 10 unexpected by the user is less likely to be performed.

The robot control device 15 according to this embodiment is able to output an associated correspondence of: data related to situations of the robot 10 and surroundings of the robot 10, the data being received by the learned model 43; data related to a movement of the robot 10 based on an output from the learned model 43; and at least either of the completion rate or the certainty factor. The associated correspondence is outputted as a movement log, for example.

This can provide information useful to examine and evaluate the movement of the robot 10, for example.

In the robot control device 15 according to this embodiment, the learned model 43 is capable of expressing a state transition, and capable of outputting a movement corresponding to each state. The robot control device 15 further includes a soundness factor acquisition section 53 that acquires a soundness factor indicating the degree to which a state recognized by the learned model 43 is preferable for the user.

Accordingly, the user can further obtain information useful to infer the reason why the learned model 43 has made an output in response to an input.

The robot control device 15 according to this embodiment is capable of outputting a movement log including the input data received by the learned model 43 and data related to a movement of the robot 10 based on the output data outputted by the learned model 43. With respect to a movement of the robot 10 described in the movement log, the user is allowed to give an evaluation for each movement corresponding to a part of the series of works. Based on the evaluation given by the user, the robot control device 15 adjusts a soundness factor corresponding to the state in the learned model 43.

Accordingly, by partially evaluating the movements of the robot 10, the user can adjust the control so as to increase the likelihood of performing a preferable movement. This makes it easier to provide a sense of conviction about the robot control, even with use of the learned model 43.

After adjusting the soundness factor corresponding to the state based on the evaluation given by the user, the robot control device 15 according to this embodiment performs at least either of adjustment of a parameter of the learned model 43 or reinforcement learning such that the state where the soundness factor is high can be obtained.

Accordingly, a control of the robot 10 desired by the user can be performed easily.

In the robot control device 15 according to this embodiment, the movement log includes the soundness factor acquired by the soundness factor acquisition section 53.

This allows the user to refer to the soundness factor when partially evaluating the movements of the robot 10. Accordingly, the evaluation can be made properly, and therefore a control of the robot 10 desired by the user can be performed efficiently.

The robot control device 15 according to this embodiment is able to output an associated correspondence of: the input data received by the learned model 43; data related to a movement of the robot 10 based on the output data outputted by the learned model 43; and the soundness factor.

This can provide information useful to examine and evaluate the movement of the robot 10, for example.

In this embodiment, the robot system 1 includes the robot control device 15 and the robot 10.

Accordingly, the robot system 1 that can easily provide the user with a sense of conviction about the robot movement can be achieved.

While a preferred embodiment of the present invention has been described above, the above-described configurations may be modified, for example, as follows.

Ranges of values that can be taken by the completion rate, the certainty factor, and the soundness factor are optional, and for example, they can be from 0 to 1.

The learned model 43 may be configured to learn the relationship between the sensor information and the movement instruction given to the robot 10, instead of learning the relationship between the sensor information and the user operation force.

In the above-described embodiment, the robot control device 15 re-creates the learned model 43 by adjusting the value of the soundness factor based on the evaluation value set by the user. The robot control device 15, alternatively, may be configured to re-create the learned model 43 (in other words, to correct the learned model 43) through reinforcement learning with use of the evaluation value set by the user. In this configuration, the evaluation value is used as a reward in performing the reinforcement learning.

A sensor that is not any of the movement sensor 11, the force sensor 12, and the camera 13 may be used as a sensor (state sensor) for acquiring states of the robot 10 and surroundings of the robot 10.

The robot system 1 may be configured such that the operation section 21 serves as a master arm used for a remote control while the robot 10 serves as a slave arm. In such a configuration, the AI section 40 can create the learned model 43 that has undergone learning based on user's operations on the master arm.

REFERENCE SIGNS LIST 1 robot system
10 robot
11 movement sensor
12 force sensor
13 camera
15 robot control device
30 movement switching section (control data acquisition section)
43 learned model
51 completion rate acquisition section
52 certainty factor acquisition section

The invention claimed is:

1. A robot control device comprising:
a learned model created through learning work data composed of input data and output data, the input data including states of a robot and surroundings of the robot in a case where a human operates the robot to cause the robot to perform a series of works, the output data including a human operation corresponding to the case or a movement of the robot caused by the human operation; and
a processor that is configured to:
acquire control data on the robot used to make the robot perform the works, the acquisition being made by obtaining output data related to a human operation or a movement of the robot from the learned model, the human operation or the movement of the robot being presumed in response to and in accordance with input data received by the learned model, the input data being related to states of the robot and surroundings of the robot;
acquire a completion rate indicating to which progress level in the series of works the output data outputted by the learned model corresponds; and
acquire a certainty factor indicating a probability of the human operation or the movement of the robot being presumed in a case where the learned model outputs the output data in response to reception of the input data, wherein:
the processor is configured to acquire control data on the robot used to make the robot perform the works based on the output data outputted by two or more learned models that are created each corresponding to each of different series of works,
the processor is configured to control the robot such that the robot performs coupled works in which the different series of works are chronologically coupled, by successively performing controls of the robot based on the output data outputted respectively by the two or more learned models, and
a learned model of the two or more learned models is switched on a condition that the certainty factor is a predetermined level or higher.

2. The robot control device according to claim 1, wherein the processor is configured to monitor the completion rate acquired.

3. The robot control device according to claim 2, wherein if, as a result of monitoring by the processor, the completion rate is continuously kept less than a predetermined value for a predetermined period or longer, the processor is configured to stop controlling the robot in the middle of the works.

4. The robot control device according to claim 2, wherein if, as a result of monitoring by the processor, the completion rate is continuously kept less than a predetermined value for a predetermined period or longer, the processor is configured to control the robot such that works having changed settings are applied in the middle of the works.

5. The robot control device according to claim 1, wherein the completion rate is obtained based on a result of clustering data pieces including states of the robot and surroundings of the robot, the states being chronologically acquired.

6. The robot control device according to claim 1, wherein the processor is configured to monitor the certainty factor acquired.

7. The robot control device according to claim 6, wherein the processor is configured to generate information for identifying movement log of the robot indicating the input data received by the learned model when the certainty factor is equal to or less than a predetermined value.

8. The robot control device according to claim 1, wherein the processor is configured to terminate the control of the robot based on the output data outputted by the learned model, in a state where the certainty factor is equal to or greater than a predetermined value, the state corresponding to a halfway point in the series of works.

9. The robot control device according to claim 1, wherein the processor is configured to output an associated correspondence of:
data related to states of the robot and surroundings of the robot, the data being received by the learned model;
data related to a movement of the robot based on an output from the learned model; and
at least either of the completion rate or the certainty factor.

10. The robot control device according to claim 1, wherein
the learned model is configured to express a state transition, and configured to output a movement corresponding to each state,
the processor is configured to acquire a soundness factor that is a numerical value of an evaluation of the robot's behavior based on an evaluation given by the user,
the processor is configured to output a movement log, the movement log including the input data received by the learned model and data related to a movement of the robot based on the output data outputted by the learned model,
with respect to a movement of the robot described in the movement log, the user is allowed to give an evaluation for each movement corresponding to a part of the series of works, and
based on the evaluation given by the user, the processor adjusts the soundness factor corresponding to the state in the learned model.

11. The robot control device according to claim 10, wherein
after adjusting the soundness factor corresponding to the state based on the evaluation given by the user, the processor is configured to perform at least either of adjustment of a parameter of the learned model or reinforcement learning such that the state where the soundness factor is high can be obtained.

12. The robot control device according to claim 11, wherein
the movement log includes the soundness factor acquired by the processor.

13. The robot control device according to claim 10, wherein
the processor is configured to output an associated correspondence of:
the input data received by the learned model;
data related to a movement of the robot based on the output data outputted by the learned model; and
the soundness factor.

14. A robot system comprising:
the robot control device according to claim 1; and
the robot.

15. A robot control method using a learned model that denotes a model created through learning work data composed of input data and output data, the input data including states of a robot and surroundings of the robot in a case where a human operates the robot to cause the robot to perform a series of works, the output data including a human operation corresponding to the case or a movement of the robot caused by the human operation, the robot control method comprising:
a control data acquisition step of acquiring control data on the robot used to make the robot perform the works, by obtaining output data related to a human operation or a movement of the robot from the learned model, the human operation or the movement of the robot being presumed in response to and in accordance with input data received by the learned model, the input data being related to states of the robot and surroundings of the robot;
a completion rate acquisition step of acquiring a completion rate indicating to which progress level in the series of works the output data outputted by the learned model corresponds; and
a certainty factor acquisition step of acquiring a certainty factor indicating a probability of the human operation or the movement of the robot being presumed in a case where the learned model outputs the output data in response to reception of the input data, wherein:
control data on the robot used to make the robot perform the works is acquired based on the output data outputted by two or more learned models that are created each corresponding to each of different series of works,
the robot is controlled such that the robot performs coupled works in which the different series of works are chronologically coupled, by successively performing controls of the robot based on the output data outputted respectively by the two or more learned models, and
a learned model of the two or more learned models is switched on a condition that the certainty factor is a predetermined level or higher.

16. A robot control device comprising:
a learned model created through learning work data composed of input data and output data, the input data including states of a robot and surroundings of the robot in a case where a human operates the robot to cause the robot to perform a series of works, the output data including a human operation corresponding to the case or a movement of the robot caused by the human operation; and
a processor that is configured to:
acquire control data on the robot used to make the robot perform the works, the acquisition being made by obtaining output data related to a human operation or a movement of the robot from the learned model, the human operation or the movement of the robot being presumed in response to and in accordance with input data received by the learned model, the input data being related to states of the robot and surroundings of the robot;
acquire a completion rate indicating to which progress level in the series of works the output data outputted by the learned model corresponds; and
acquire a certainty factor indicating a probability of the human operation or the movement of the robot being presumed in a case where the learned model outputs the output data in response to reception of the input data, wherein:
the learned model is configured to express a state transition, and configured to output a movement corresponding to each state,
the processor is configured to acquire a soundness factor that is a numerical value of an evaluation of the robot's behavior based on an evaluation given by the user,
the processor is configured to output a movement log, the movement log including the input data received by the learned model and data related to a movement of the robot based on the output data outputted by the learned model, with respect to a movement of the robot described in the movement log, the user is allowed to give an evaluation for each movement corresponding to a part of the series of works, and based on the evaluation given by the user, the processor adjusts the soundness factor corresponding to the state in the learned model.

17. A robot control method using a learned model that denotes a model created through learning work data composed of input data and output data, the input data including states of a robot and surroundings of the robot in a case where a human operates the robot to cause the robot to perform a series of works, the output data including a human operation corresponding to the case or a movement of the robot caused by the human operation, the robot control method comprising:

a control data acquisition step of acquiring control data on the robot used to make the robot perform the works, by obtaining output data related to a human operation or a movement of the robot from the learned model, the human operation or the movement of the robot being presumed in response to and in accordance with input data received by the learned model, the input data being related to states of the robot and surroundings of the robot;

a completion rate acquisition step of acquiring a completion rate indicating to which progress level in the series of works the output data outputted by the learned model corresponds; and a certainty factor acquisition step of acquiring a certainty factor indicating a probability of the human operation or the movement of the robot being presumed in a case where the learned model outputs the output data in response to reception of the input data, wherein:

the learned model is configured to express a state transition, and configured to output a movement corresponding to each state, a soundness factor that is a numerical value of an evaluation of the robot's behavior based on an evaluation given by the user is acquired, a movement log is output, the movement log including the input data received by the learned model and data related to a movement of the robot based on the output data outputted by the learned model, with respect to a movement of the robot described in the movement log, the user is allowed to give an evaluation for each movement corresponding to a part of the series of works, and based on the evaluation given by the user, the soundness factor is adjusted corresponding to the state in the learned model.

* * * * *